June 30, 1970 A. FIEDLER 3,517,524
APPARATUS FOR PRODUCING AND DISPENSING FROZEN
AND SEMILIQUID PRODUCTS
Filed April 22, 1968 5 Sheets-Sheet 1

INVENTOR:
ARMIN FIEDLER
BY
Mason, Kolehmainen, Rathburn & Wyss
ATT'YS

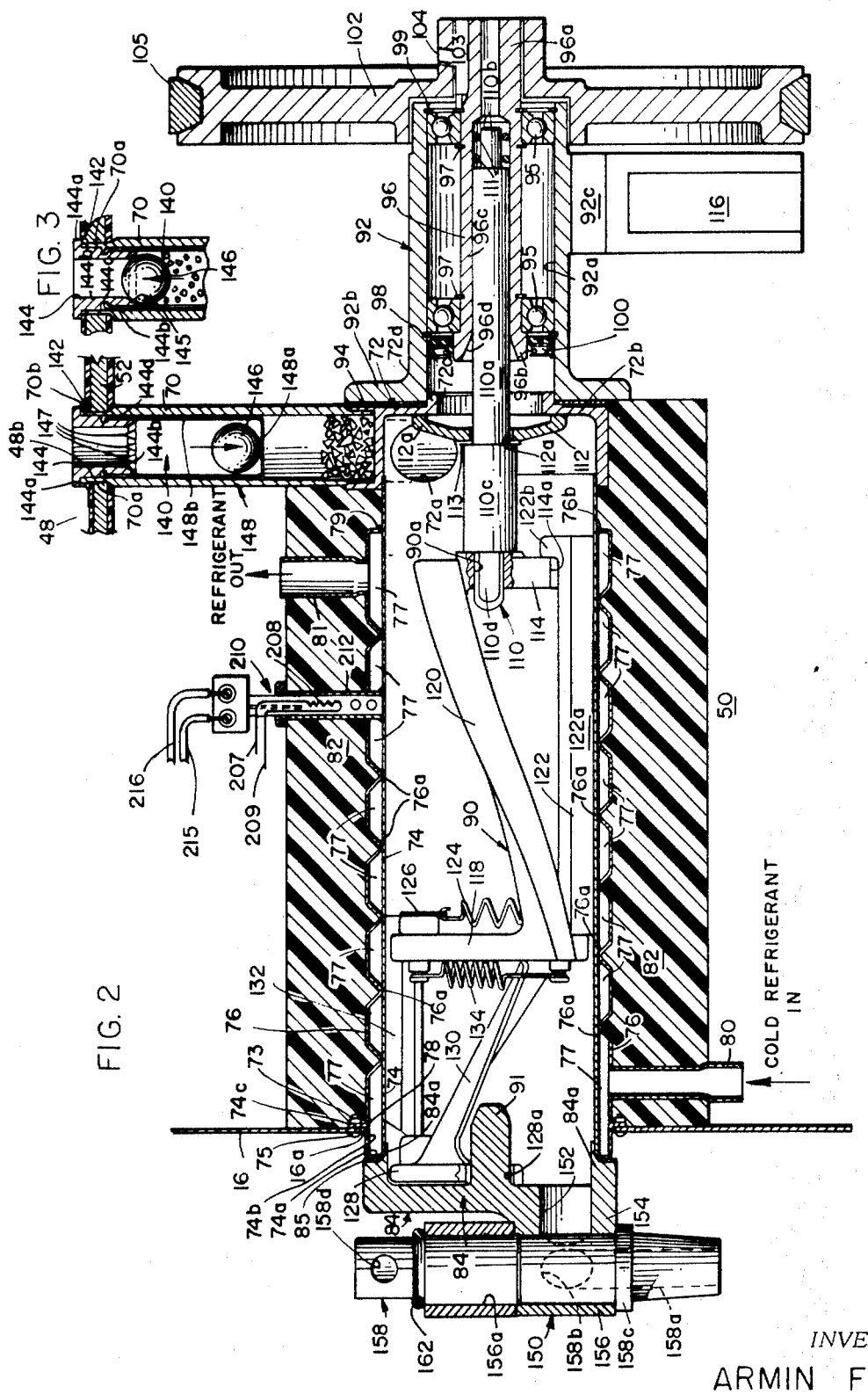

June 30, 1970 — A. FIEDLER — 3,517,524
APPARATUS FOR PRODUCING AND DISPENSING FROZEN AND SEMILIQUID PRODUCTS
Filed April 22, 1968 — 5 Sheets-Sheet 3
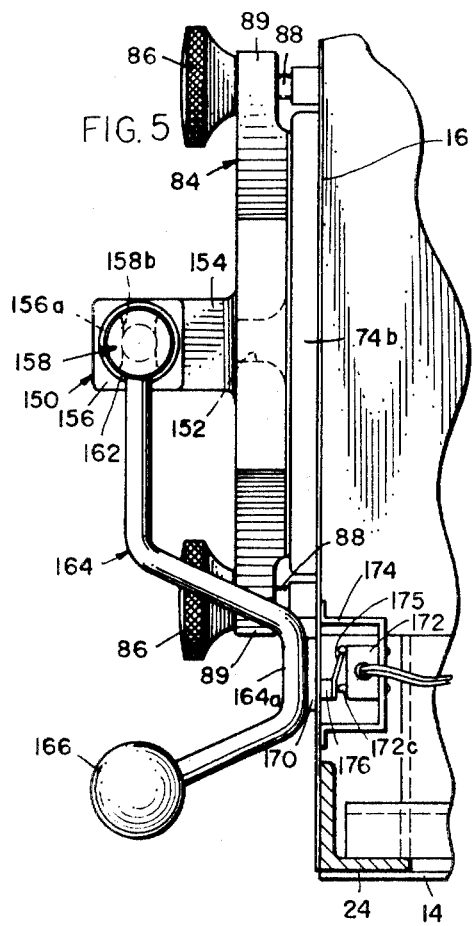
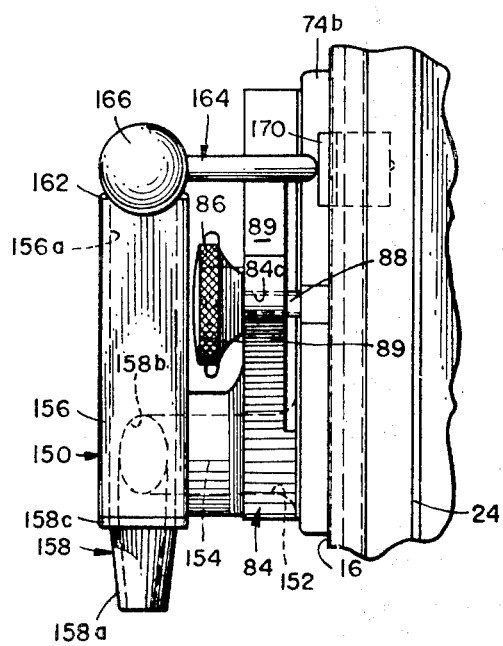
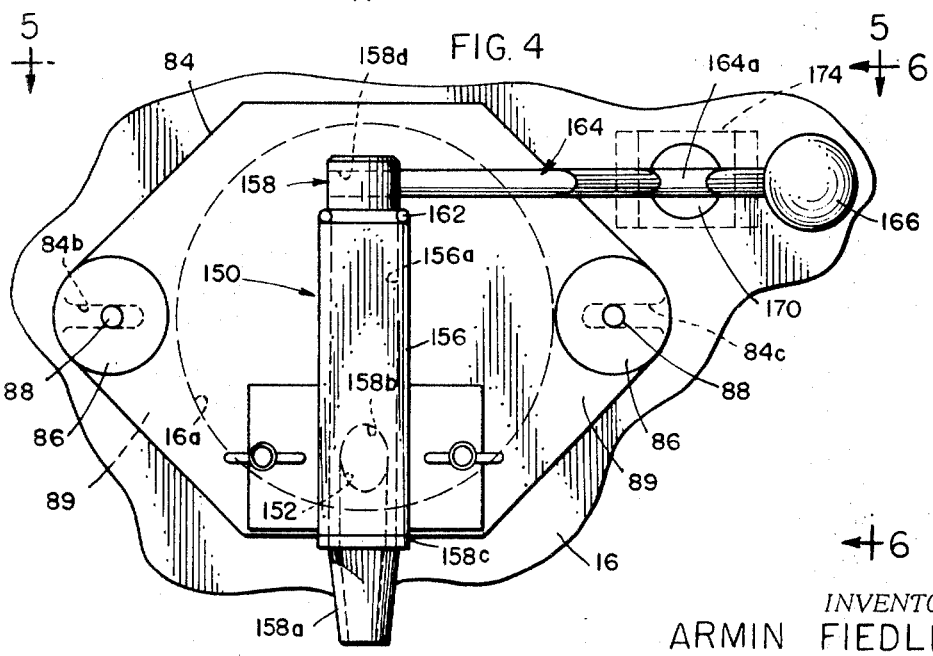
INVENTOR:
ARMIN FIEDLER

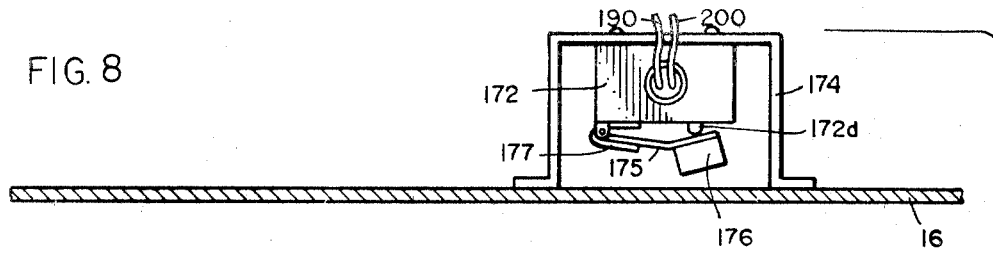
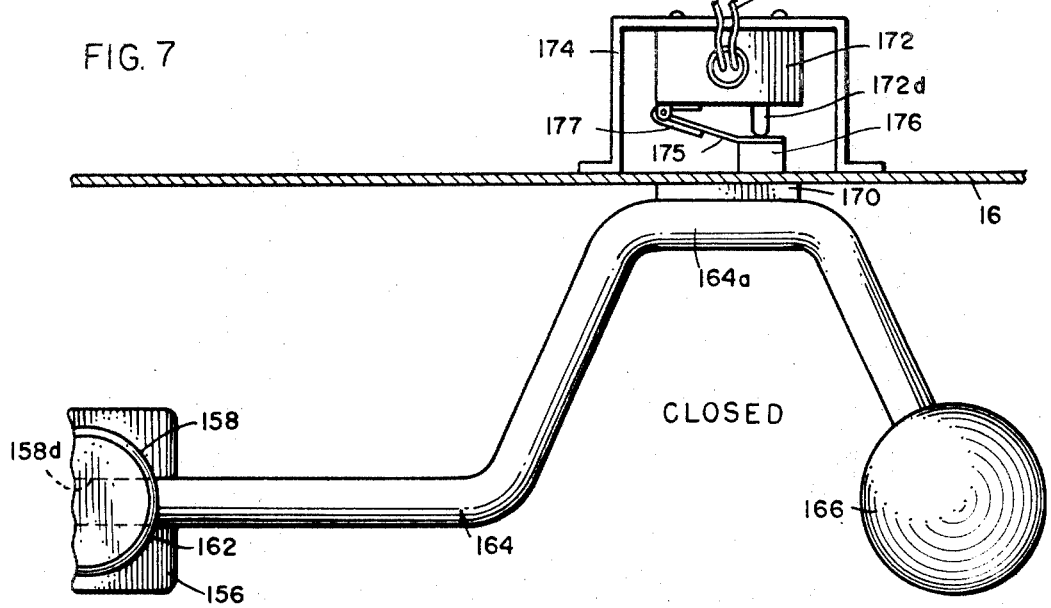

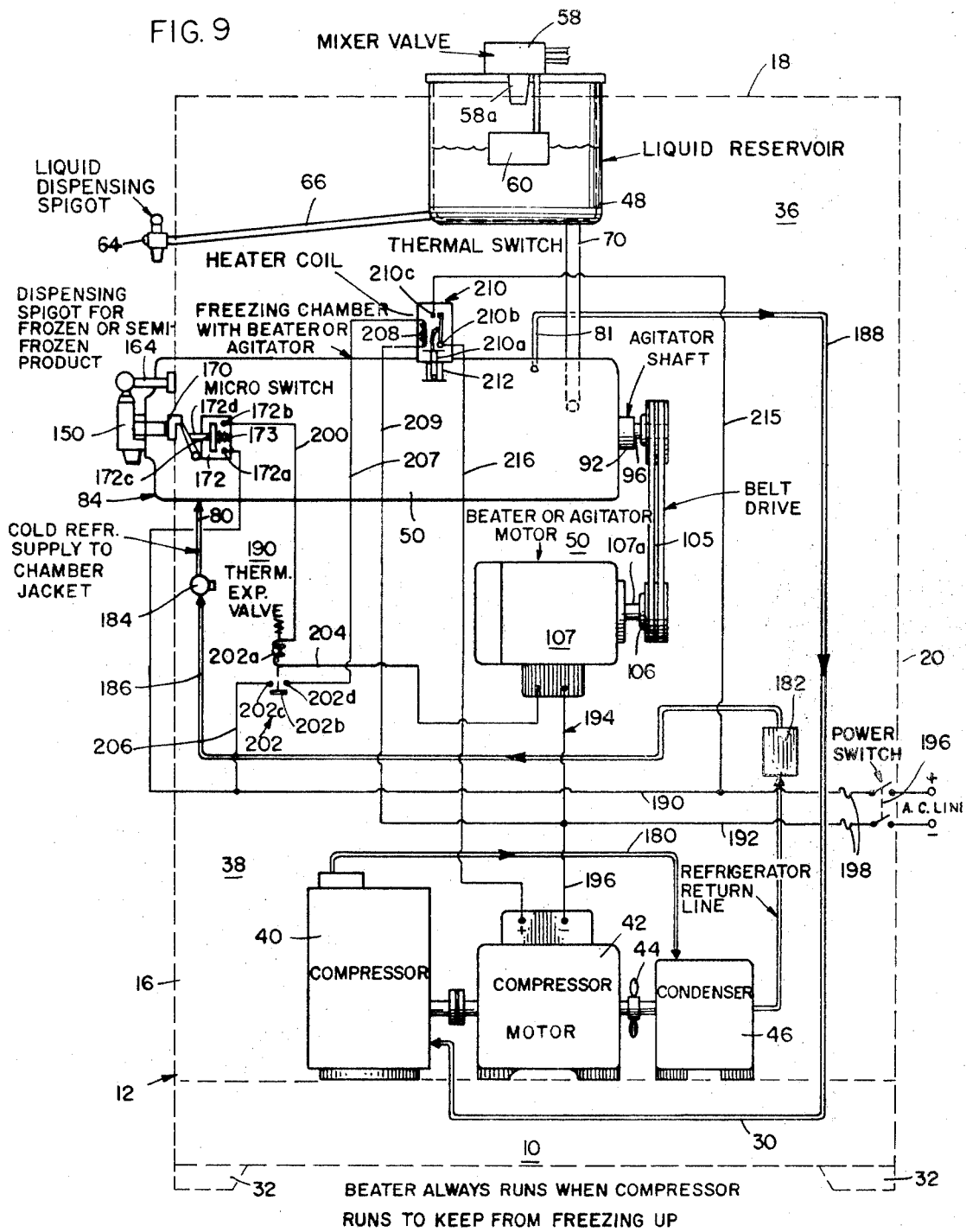

United States Patent Office 3,517,524
Patented June 30, 1970

3,517,524
APPARATUS FOR PRODUCING AND DISPENSING FROZEN AND SEMILIQUID PRODUCTS
Armin Fiedler, Chicago, Ill., assignor to Tastee Freez Industries, Inc., Chicago, Ill., a corporation of Delaware
Filed Apr. 22, 1968, Ser. No. 722,871
Int. Cl. F25c 7/10
U.S. Cl. 62—188
8 Claims

ABSTRACT OF THE DISCLOSURE

Apparatus for producing and dispensing frozen and semiliquid products comprising container means for holding a supply of said product in liquid form, a freezing chamber for freezing and agitating said product, conduct means communicating between said container means and freezing chamber for supplying liquid product to the latter for freezing, first dispenser means in communication with said container means for dispensing liquid product therefrom and second, independent, dispenser means in communication with said freezing chamber for dispensing frozen and semiliquid products therefrom.

---

The present invention relates to a new and improved apparatus for producing and dispensing frozen and semiliquid products and, more particularly, relates to a new and improved apparatus capable of delivering the product in both a liquid form and a frozen or semiliquid condition.

Heretofore, in machines for making frozen or semiliquid food products, the product is available at the dispensing outlet in only one form or condition. Generally, the product in liquid form is fed into one end of a freezing chamber and during the chilling process is agitated and mixed and finally dispensed from the other end of the chamber in a frozen or semiliquid condition. With the demand for new types of frozen and semiliquid food products, it is desirable to provide a machine capable of dispensing the product both in a liquid form and in a frozen or semiliquid condition and, accordingly, it is an object of the invention to provide a new and improved machine suitable for making and dispensing both liquid and frozen or semiliquid food products.

Another object of the invention is the provision of a new and improved apparatus or machine of the class described capable of delivering carbonated beverages, both in the liquid and in the frozen or semiliquid state.

Another object of the invention is the provision of a new and improved machine of the class described employing novel valve means between the liquid container and freezing chamber which prevents frozen or semiliquid product from reaching the liquid container and causing the contents to freeze, yet at the same time permitting gases to pass from the freezing chamber to the liquid container and permits liquid to flow from the latter to the former.

Yet another object of the present invention is the provision of a new and improved machine of the class described employing a novel switching arrangement for energizing the agitator in the freezing chamber whenever the product is being dispensed therefrom.

Still another object of the present invention is the provision of a new and improved switching arrangement for the purpose aforesaid wherein a switch is mounted on the inside wall of the machine cabinet and is actuated by means externally of the cabinet wall through magnetic force, thus eliminating the requirement for openings in the wall adjacent the switch which normally results in a need for frequent cleaning of the area around and behind the openings for sanitary reasons, and which often results in the switch malfunctioning because of foreign materials entering through the openings.

Another object of the invention is the provision of a new and improved machine of the class described employing novel means for energizing the refrigeration system whenever frozen or semiliquid product is being dispensed from the freezing chamber.

Yet another object of the invention is the provision of a new and improved machine of the class described including a freezer agitator chamber with a novel arrangement for sensing the temperature of the product therein to control the refrigeration system.

Briefly, the foregoing and other objects and advantages of the invention are achieved in one embodiment thereof, including a freezer-agitator chamber wherein the product is mixed or agitated while it is being chilled or frozen and a liquid container above the chamber for holding a supply of the food product in liquid form. Conduit means are provided to interconnect the liquid container and freezing chamber for supplying liquid product to the latter, and novel valve means are provided for preventing frozen or semiliquid product from the freezer-agitator chamber from passing upwardly through the conduit means into the liquid container. First dispenser means in communication with the liquid container is provided for dispensing the product in liquid form, and second, independent, dispenser means in communication with the outlet end of the freezing chamber is provided for dispensing the product in a frozen or semiliquid condition.

The liquid container, freezing chamber, and other components are mounted in a cabinet including a front wall of nonmagnetic material, such as stainless steel, and the dispensing outlets are mounted to open externally of the front wall. Novel means are provided for energizing the agitator in the freezing compartment whenever product is being dispensed, including switch means mounted adjacent the inside surface of the front wall and actuated by magnetic means externally of the cabinet associated with the freezing chamber dispenser. Accordingly, no openings in the front wall adjacent the switch means are required and the switch means is better protected from damage or contamination thereby and thus cleaning problems are reduced.

For a better understanding of the invention, reference should be had to the following detailed description when taken in conjunction with the drawings, in which:

FIG. 2 is an enlarged, longitudinal, sectional view of the freezer-agitator chamber and the agitator therein and constructed in accordance with the invention;

FIG. 3 is a fragmentary, enlarged, sectional view of a portion of the conduit and valve means between the liquid container and freezer-agitator chamber of the apparatus of FIG. 2 and illustrating the valve means in a closed or upper position;

FIG. 4 is a fragmentary, enlarged, front elevational view of the freezer-agitator chamber of FIG. 2 and surrounding portions of the cabinet wall, and illustrates the dispensing unit for the chamber in a shut-off or closed position;

FIG. 5 is a fragmentary, sectional view taken substantially along lines 5—5 of FIG. 4 looking downwardly on the dispensing assembly thereof;

FIG. 6 is an enlarged, fragmentary, sectional view taken substantially along lines 6—6 of FIG. 4;

FIG. 7 is a view similar to FIG. 5 somewhat schematically illustrating the novel means for energizing and de-energizing the agitator in the freezer-agitator chamber in response to opening and closing of the dispenser.

FIG. 8 is a view similar to FIG. 7 but illustrating the dispenser handle in the open position for dispensing product from the freezer-agitator chamber; and FIG. 9 is a schematic diagram illustrating an electrical circuit for the apparatus of FIG. 1 and including the various component parts and refrigeration system of the apparatus in schematic form.

Figure 1:
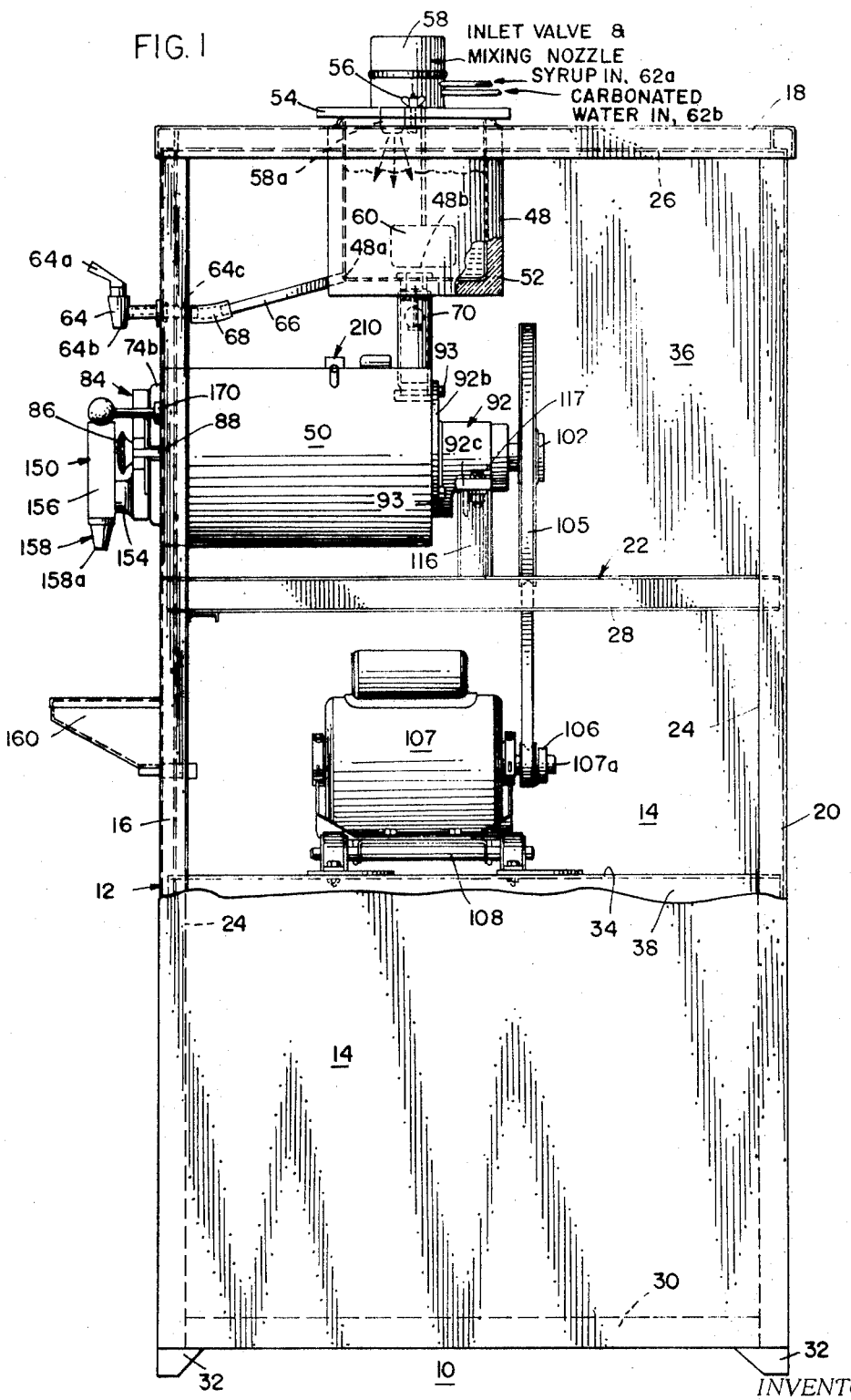
FIG. 1 is a side elevational view of a new and improved apparatus for producing and dispensing liquid and frozen or semiliquid products in accordance with the present invention with portions of the cabinet wall broken away to illustrate the internal operating components of the apparatus.

Referring now, more particularly, to the drawings, therein, is illustrated a new and improved apparatus for producing and dispensing liquid and frozen or semiliquid food products constructed in accordance with the present invention and referred to generally by the reference number 10. The apparatus 10 includes a housing or cabinet 12 having a pair of sidewalls 14, a front wall 16, a top wall cover 18, and a removable rear wall 20. The front wall 16 is fabricated of nonmagnetic material, such as stainless steel, and preferably the other cabinet walls are also constructed of stainless teel which is tough, strong, corrosion resistant, and relatively easy to keep clean and sanitary.

The cabinet walls are supported on a metal framework or skeleton frame 22, preferably fabricated of angle iron and including corner legs 24, top cross member 26, intermediate cross member 28, and lower cross members 30. The cabinet 12 is designed to rest upon the floor or other surface and, for this purpose, a plurality of corner legs 32 may be provided to permit the floor surface beneath the cabinet to be washed.

The cabinet includes an intermediate, horizontal, support structure 34 providing an upper portion 36 and a lower chamber or portion 38 which houses a refrigeration system for the apparatus, including a refrigerant compressor 40 (FIG. 9), a compressor drive motor 42 and fan 44, and a condenser 46.

The upper portion 36 of the cabinet 12 is adapted to hold a liquid container or reservoir 48 and a freezer-agitator chamber 50 disposed therebelow. The liquid reservoir is provided with an insulating jacket 52 around the exterior surface of the sidewall and the bottom wall, and the upper end portion of the reservoir projects upwardly through an opening in the top wall 18 and is closed by a removable cover or lid 54 secured in place by thumbscrews 56.

The liquid container or reservoir 48 is adapted to hold and maintain a quantity of food product in liquid form, such as a carbonated beverage, and the product is introduced into the reservoir through a mixing valve assembly 58 mounted on the removable cover 54. The mixing valve 58 may be of a conventional type and includes a lower outlet or nozzle 58a for dispensing liquid into the reservoir. The valve is automatically controlled by a float assembly 50 in order to maintain the liquid at a constant level in the reservoir 48. When the liquid food product is a carbonated beverage, syrup and carbonated water are supplied to the mixing valve 58 through lines 62a, 62b, and these lines are connected to appropriate containers or sources (not shown) for supplying the desired fluids to the mixing valve at the required rate.

In accordance with the present invention, the apparatus 10 is capable of supplying the food product available in the reservoir 48 in both a liquid form and in a frozen or semiliquid condition. For the purpose of dispensing the product in liquid form, the reservoir 48 is provided with an outlet 48a adjacent the lower end on the front side thereof, and the outlet is connected to a manually operated, liquid dispensing valve 64 via a liquid conduit or line 66. The liquid dispenser valve 64 is mounted on the front wall 16 with a discharge outlet or nozzle 64b externally of the cabinet and includes an operating handle 64a which is movable to open and close the outlet to selectively dispense liquid product into a glass or paper cup placed or held below the valve outlet. The liquid dispenser valve includes a short supply or inlet pipe 64c which projects inwardly into the interior of the cabinet 12 through an opening in the front wall 16. Preferably, the inlet pipe 64c is coupled to the conduit or supply pipe 66 through a removable flexible sleeve 68 so that the valve may be removed from the cabinet wall.

In accordance with the invention, the freezer-chamber 50 (hereinafter called the "freezing chamber") is mounted in the upper section 36 of the cabinet 12 beneath the liquid container or reservoir 48 to receive liquid product therefrom through a liquid feeding conduit 70 connected at its upper end to a centrally located outlet opening 48b in the bottom wall of the reservoir, and the conduit and associated components are best shown in enlarged detail in FIGS. 2 and 3. The lower end of the conduit 70 is connected to an inlet opening 72a formed in the annular sidewall of a cuplike rearward end member 72 of the freezing chamber 50. Liquid product is fed from the reservoir or container 48 through the conduit 70 into the rear end of the freezing chamber 50 and is chilled in the chamber before being dispensed in a frozen or semiliquid condition from the forward end thereof.

The chamber 50 comprises a hollow, cylindrical vessel disposed horizontally in the cabinet 12 with the forward end of the vessel extending through and supported in a large circular opening 16a formed in the front wall of the cabinet. The vessel includes a tubular, cylindrical inner wall 74 of stainless steel or the like joined at its rearward end to the annular wall of the cuplike rear end fitting 72. The forward end portion of the inner wall 74 protrudes through and is supported in the openings 16a in the cabinet front wall and includes an outwardly projecting flange portion having an annular front face 74a, an integrally formed rearwardly extending annular collar or outer wall 74b, and a rearward radial flange 74c bearing against the inner surface of the cabinet front wall 16 outwardly of the circular opening 16a. The flange 74c is secured to the front wall 16 by a plurality of radially spaced bolts 75 which project through spaced holes in the cabinet wall around the opening 16a and openings in the flange into an annular collar or washer 73 spaced behind the flange. By removing the bolts from the front face of the cabinet the freezing chamber can be withdrawn or disassembled readily from the cabinet front wall 16.

In order to cool or chill the inner chamber wall 74 and thereby freeze or partially freeze the product contained in the freezing chamber 50, an annular refrigerant jacket 76 is mounted to extend around the exterior surface of the inner sidewall. The jacket comprises a plurality of convolutions forming a continuous, spirally disposed passage 77 around the exterior of the inner wall 74, and the spiral convolutions are formed by a continuous, inwardly extending ridge 76a contacting the exterior surface of the wall 74. The passage 77 starts adjacent the forward end of the freezing chamber and spirals rearwardly around the chamber toward the rearward end. If desired, the jacket may be secured to the outer surface of the chamber wall 74 by welding along the innermost edge of the continuous ridge 76a, and the forward end of the jacket is welded, or otherwise sealed, against the back face of the flange 74c, as at 78 (FIG. 2). The rearward end of the jacket is closed by an inwardly extending annular flange portion 76b welded, or otherwise sealed, around its inner edge to the outer surface of the wall 74, as at 79.

Chilled refrigerant is introduced into the passage 77 at the forward end of the jacket 76 through an inlet pipe or nipple 80 and passes spirally around the wall 74 through the continuous passage 77 toward the rear end of the chamber where it leaves the jacket via an outlet pipe or nipple 81. Thus, heat from the product within the freezing chamber is transferred through the inner wall 74 and absorbed by the refrigerant flowing through the passage 77. Accordingly, the liquid product entering the rearward end of the freezing chamber through the inlet opening 72a is chilled while moving forwardly through the chamber toward the forward end, and the temperature and flow rate of the refrigerant through the jacket is adjusted and controlled so that the product is at the desired frozen or semi-liquid consistency by the time it reaches the forward end of the chamber where it is dispensed for consumption.

In order to insulate the freezing chamber 50, the jacket is covered by a layer of insulating material 82, preferably of the foam type, and cast in place after the cooling jacket has been attached to the inner chamber wall 74. The forward end of the freezing chamber 50 is closed by a removable closure plate 84 which includes an annular flange 84a extending inwardly into the forward end of the chamber wall 74 (FIG. 2) and a gasket 85 is provided for sealing between the forward end of the flange 74a and the closure plate.

The closure plate 84 is fabricated of stainless steel or the like and is held in place by a pair of knurled knobs 86 which are threaded onto a pair of studs 88 projecting outwardly of and attached to the front wall 16 on opposite sides of the circular opening 16a. The studs 88 project through slotted portions 84b and 84c (FIG. 4) formed in a pair of laterally extending triangular, wing-like projections or ears 89 formed on opposite sides of the closure plate.

The removable closure plate also provides support for the forward end of an agitator assembly 90 mounted for rotation in the freezing chamber, and for this purpose includes a centrally located, inwardly projecting pin or projection 91 frustoconically tapered at its outer end and aligned with the longitudinal axis of the freezing chamber.

The rear end closure member 72 includes a radial end wall 72b having a central opening 72c in coaxial alignment with the longitudinal axis of the freezing chamber. An outwardly protruding annular ridge 72d is formed around the opening 72c and projects outwardly into the cylindrical, axial bore 92a of a shaft supporting sleeve member 92. The sleeve member 92 includes an outwardly extending radial flange 92b at the inner end, which is bolted to the radial end wall 72b of the rear end closure member by a plurality of cap screws 93 (FIG. 1), and the flanges 92b and 72b are insulated from one another by a heat insulating annular gasket 94 (FIG. 2). A pair of spaced bearing assemblies 95 are mounted at opposite ends of the sleeve bore 92a in order to support for rotation a hollow shaft member 96 having an outer end portion 96a of reduced diameter projecting outwardly from the outer end of the sleeve. The bearing assemblies 95 are restrained against longitudinal displacement on the hollow shaft member 96 by a pair of inner snap rings 97 seated in annular grooves provided on the shaft member and engaging the facing annular sides of the inner races of the bearing assemblies. The bearing assemblies are restrained against longitudinal displacement in the sleeve bore 92a by a snap ring 98 seated in an annular groove formed in the bore adjacent the inner end portion thereof and a similar, outer snap ring 99 is seated in a pair of facing, inner and outer annular grooves, formed on the shaft member 96 and in the bore of the sleeve, respectively, adjacent the outer end of the sleeve.

The inner end of the sleeve bore 92a is sealed around the hollow shaft member 96 by a replaceable annular sanitary sealing ring assembly 100 which is press fitted into the sleeve bore adjacent a radially outwardly extending end flange 96b formed at the inner end of the shaft member 96, and the outwardly facing, radial shoulder surface of the end flange bears against the side of the inner race of the inner bearing assembly 95.

The hollow shaft member 96 is driven by a pulley 102 mounted on the outer end portion 96a and secured thereto by a key 103 and a setscrew 104. The pulley or sheave is rotated by an endless V-belt 105 driven by a pulley 106 mounted on the shaft 107a of a drive motor 107 (FIG. 1) supported on a motor base 108 mounted on the support structure 34 in the cabinet. The bearing assemblies 95 and the space between the bearings in the sleeve bore 92a are packed or filled with a lubricant so the shaft member 96 will rotate smoothly whenever the motor 107 is energized.

The hollow shaft member 96 includes a longitudinal bore having a large diameter portion 96c open at the inner end of the shaft with a frustoconically tapered, enlarged portion 96d. An inner shaft member 110 drivingly interconnects the shaft member 96 with the rearward end of the agitator assembly 90, and for this purpose the shaft 110 includes a middle portion 110a intermediate its ends dimensioned to fit tightly within the bore 96c of the shaft member 96. The outer end of the shaft 110 includes a flatted end portion 110b of reduced transverse dimension and pairs of drive pins 111 projecting through the shaft member 96 are disposed on opposite side faces of the flatted end portion to drivingly interconnect the two shafts. The shaft 110 also includes a section 110c which is larger in diameter than the central portion 110a and which is disposed in the rearward end portion of the freezing chamber 50. A cuplike annular sealing member 112 is mounted in the rearward end of the freezing chamber to seal around the shaft 110 and the cup member includes an annular outer rim 112a which bears against the inside surface of the radial end wall 72b of the freezing chamber rearward end member 72. The cup-shaped sealing member 112 is formed with a central opening 112a and a resilient annular seal 113 is mounted in the opening to seal around the shaft 110 at the radial shoulder formed at the juncture of the shaft sections 110a and 110c.

In order to drive the agitator or scraper assembly 90, the shaft member 110 includes a forward end portion 110d having flatted side surfaces thereon and projecting into a flat-sided opening 90a formed in a radially extending, eccentric, rear end support arm or spoke 114. Thus, whenever the motor 107 is energized, the agitator is rotated within the inner wall 74 of the freezing chamber by means of the shaft members 110 and 96 and belt drive assembly.

The rearward end of the freezing chamber 50 is supported by an upright bracket 116 (FIGS. 1 and 3) bolted to a base member 92c formed on the lower side of the bearing sleeve 92 by a plurality of bolts 117. The upright bracket 116 is supported from the cross members 28 of the cabinet frame and by removal of the bolts 117, the freezing chamber 50 can be rearwardly withdrawn from the opening 16a in the cabinet front wall for maintenance or repair after releasing the bolts 75 as previously mentioned.

The agitator assembly 90 preferably is constructed of stainless steel or the like and can be withdrawn forwardly from the inner wall 74 of the freezing chamber after the front closure plate 84 has been removed so that the agitator can be cleaned and the interior surface of the freezing chamber can be washed and sterilized. The agitator is of a more or less conventional design and includes an intermediate radial portion 118 spaced forwardly of the rearward radial portion or spoke 114. The radial portions 114 and 118 are interconnected by a longitudinal, spiraled auger blade 120 adapted to move the product in the freezing chamber forwardly when the assembly is rotated. In addition, a longitudinal scraper member 122 is supported at its opposite end by the radial portions 114 and 118. The scraper 122 is loosely mounted on the radial members and is longitudinally parallel with the longitudinal axis of the freezing chamber. The scraper includes a beveled outer edge portion 122a adapted to scrape and remove the frozen product from the wall surface of the inner wall 74 as the agitator rotates. The rearward end of the scraper is seated loosely with a slotted portion 114a formed in the radial support member 114 and includes an inwardly extending tip projection 122b for limiting longitudinal forward travel of the scraper relative to the radial supports 114 and 118.

The forward end of the scraper 122 is loosely seated in a slotted portion (not shown) formed at one outer end of the intermediate radial member 118 and the beveled edge 122a of the scraper is biased outwardly against the surface of the inner wall by a radially disposed bias spring 124 having one end connected to a clip 126 at the opposite end of the radial member 118 and an opposite end connected to the scraper (not shown) at a point radially offset with respect to the longitudinal axis thereof.

The forward end of the agitator assembly 90 is supported for rotation on the central projection 91 of the front closure plate 84, as previously described, and for this purpose the agitator assembly includes a forward, radially extending portion 128 spaced forwardly of and parallel to the intermediate radial member 118. The forward radial member 128 is formed with a circular opening 128a coaxial with the longitudinal axis of the freezing chamber in order to accommodate the projection pin 91 and thereby support the forward end of the agitator assembly for rotation. The forward radial member 128 and intermediate radial member 118 are interconnected by a longitudinal auger or agitator 130 of spiral configuration and positioned diametrically opposite to the longer, rear spiral auger member 120. The auger 130 also moves the product toward the forward end of the freezing chamber when the agitator is rotated.

Another longitudinal scraper 132 extends between the intermediate and forward radial members 118 and 128 and this scraper is also spaced radially outwardly of the longitudinal axis of the freezing chamber to scrape the frozen product from the inside surface of the chamber wall 74. The scraper 132 is loosely mounted in slots (not shown) formed in the supporting radial members, and an outer beveled edge portion of the scraper is biased outwardly against the chamber wall 74 by a radially disposed bias spring 134 mounted on the forward side of the intermediate radial member 118.

From the foregoing description, it will be understood that the agitator assembly 90 is easily removed from within the inner wall 74 of the freezing chamber 50 through the forward end when the front closure plate 84 is taken off. The agitator is supported for rotation and driven at the rear by the shaft portion 110d and rotates whenever the motor 107 is energized. The forward end of the agitator is supported for rotation on the projection 91 of the front closure plate 84 and when the assembly is rotated, the product in the chamber, while being chilled by the refrigerant flowing through the outer jacket 77, is mixed and continuously scraped from the chamber wall and urged toward the forward end of the freezing chamber by the special flights 120 and 130.

The material adjacent the outside of the freezing chamber, being colder, tends to freeze more rapidly around the inside surface of the inner chamber wall 74 but this material is continuously being removed from the wall and moved inwardly by the floating scrapers 122 and 132. While the product is being chilled in the freezing chamber and is simultaneously being mixed and agitated by the agitator assembly 90, the spiral auger members 120 and 130 urge the product toward the forward end of the chamber, and when the product reaches the forward end it is in the desired state or condition for dispensing through the front closure plate 84, as will be described hereinafter.

To provide the desired state or consistency of the product, the temperature thereof is regulated by controlling the temperature and flow rate of refrigerant through the jacket 77. The agitator assembly 90 insures that the product does not freeze solid by continuously moving the material as it is being chilled and, in addition, air or gas entrained or evolved in the product is thoroughly dispersed and mixed therewith.

In order to prevent frozen of semifrozen material in the rearward end of the freezing chamber 50 from expanding upwardly through conduit 70 and freezing or plugging the outlet opening 48b in the reservoir 48 cutting off the supply of liquid product, a novel valve assembly 140 (FIGS. 2 and 3) is mounted on the conduit, and this valve assembly is operable in response to the level of frozen or semifrozen product in the lower portion of the conduit to block or limit the upward movement of frozen or semiliquid product while at the same time permitting liquid product and gas to flow.

The upper end portion of the conduit 70 is formed with an annular recess 70a around the outer surface thereof immediately below an outwardly extending annular flange 70b at the upper end of the conduit. The recessed portion 70a of the conduit is disposed within the outlet opening 48b in the bottom wall of the liquid reservoir 48 and an O-ring 142 is provided beneath the flange 70b to seal around the conduit at the outlet opening.

The valve assembly 140 comprises an annular sleeve or valve seat insert 144 having an outwardly extending radial flange 144a at the upper end which rests on the flange 70b of the conduit 70. The sleeve includes a hollow tubular body portion 144b extending downwardly into the conduit and formed with a concave, frustoconical, annular valve seating surface 145 at the lower end.

A light-weight, spherical, floating valve member 146 having a diameter somewhat smaller than the internal diameter of the conduit 70 is disposed below the seating surface and is movable toward and away from the seat to open and close the conduit to the travel of frozen or semifrozen food product. The seating surface 145 is formed with a plurality of small recesses or bypass slots 147 spaced radially around the surface which continuously communicate between the areas above and below the seating surface regardless of whether the spherical valve member 146 is seated or away from the lower end of the sleeve body. The recesses or passages 147 are small enough in cross section to prevent the frozen or semifrozen product in the conduit 70 from passing above the seated valve member 146 but are large enough to permit liquid or gas to bypass the valve seat and seated valve member.

Downward movement of the valve member 146 away from the seat when the level of the frozen material is low (FIG. 2) is limited by a valve retainer 148 having a diametrically disposed, lower, bight portion 148a and a pair of upwardly extending legs 148b which are removably attached to the sleeve body. To this end, the legs 148b include short, inwardly extending, hook projections 148c at their upper ends which project into diametrically opposed radially inwardly extending recesses or slots 144c formed at the upper end of longitudinally extending grooves 144d formed on the outer surface of the sleeve body 144b to accommodate the retainer legs 148b. Preferably, the retainer 148 is formed from wire made of a corrosion resistant material and is easily removed from the valve seat 144 after the seat has been retracted upwardly from the conduit 70. The spherical valve member 146 is preferably hollow and constructed of a light-weight plastic material to resist corrosion.

From the foregoing description, it will be seen that when the frozen or semifrozen product in the lower end of the conduit begins to rise upwardly, the valve member 146 is lifted off the retainer bight portion 148a and forced against the annular seating surface 145 to prevent further upward travel of the frozen material into the liquid container 48. Accordingly, the liquid in the lower portion of the reservoir never freezes and the outlet opening 48b is continuously open to permit the free flow of liquid product downwardly through the conduit 70 into the rearward end of the freezing chamber 50. Even with the valve member 146 seated or closed against the seat surface 145, liquid and gas can pass through the conduit via the small passages 147 formed in the seating surface. Thus, when a carbonated beverage is being used, any gas evolved during the mixing action that does not recombine with the solids and liquid material in the freezing chamber 50 can escape upwardly through the conduit 70 regardless of the position of the valve member 146. Conversely, liquid and gas can always flow downwardly past the seated valve member into the conduit 70 assuring an ample supply of product in the freezing chamber.

In accordance with the present invention, the front closure plate 84 is provided with a dispenser valve assembly 150 integrally formed on the outer face thereof and in communication with the forward end of the freezing chamber 50 through an outlet opening or passage 152 at the lower portion of the closure plate. The outlet passage is formed in an outwardly projecting integrally formed body portion 154 which is integrally joined to the lower portion of a vertically extending, valve holding body or housing 156 which may be square or rectangular in cross section (FIG. 5). The housing 156 is provided with a vertically extending, cylindrical bore 156a extending longitudinally between the upper and lower ends thereof, and an elongated, cylindrical, valve member 158 is seated for rotation within the bore to open and close the outer end of the dispensing passage or outlet 152. The lower end portion of the movable valve body includes a downwardly extending, hollow, frustoconical nozzle portion 158a for dispensing the product downwardly into a cup or other receptacle placed therebeneath on a shelf or bracket 160 (FIG. 1) projecting outwardly from the front wall 16 of the cabinet.

The hollow interior of the nozzle portion 158a extends upwardly into the main portion of the valve body above the lower end of the housing 156 and is in communication with a transverse radial passage 156b (FIG. 5) which is adapted to register with the outer end of the passage 152 when the valve is opened to dispense product from the chamber. The valve member 158 is rotatable about its longitudinal axis in the housing bore 156a so that the passage 158b is registered with or closed off from the passage 152. The upper end of the nozzle portion 158a is formed with an annular sealing flange 158c which bears against the bottom end of the valve housing 156. The valve member 158 extends upwardly above the upper end of the valve housing 156 and a removable annular sealing ring 162 is provided to seal between an annular groove in the valve member and the upper end of the valve housing and thereby support the valve member for rotation in the housing.

The dispenser valve assembly 150 associated with the front closure plate 84 of the freezing chamber 50 is easily operable to dispense the frozen or semiliquid product from the freezing chamber. The valve assembly 150 is completely independent of the liquid dispenser valve 64 and, accordingly, the machine 10 is extremely flexible in operation; for example, a cup or container may first be partially filled with frozen or semiliquid product from the dispenser 150 and then topped off with liquid product from the liquid dispenser valve 64.

In order to easily open and close the valve member 158, a removable handle 164 is inserted into a transverse, diametrical passage 158d (FIGS. 2, 7, and 8) formed adjacent the upper end of the valve member and parallel with the lower transverse passage 158b. The handle includes a knob 166 at the outer end which is movable toward and away from the front wall 16 of the cabinet between a valve closing position (FIG. 7) and a valve opening position (FIG. 8). Inboard of the knob 156 the handle 164 is formed in a U-shaped configuration comprising a bight portion 164a adapted to lie in parallel relation and spaced slightly outwardly of the front wall 16 when the dispenser valve is closed. A ferromagnetic member 170 formed in the shape of a disk is mounted on the bight portion 164a of the handle and closely abuts the outer surface of the front wall 16 when the handle is closed. Immediately behind the wall 16 in the interior of the cabinet 12 and adjacent the position of the disk member 170 when the handle is closed, a microswitch 172 is mounted for selectively energizing the motor 107 whenever the dispensing valve is opened.

The microswitch is mounted on a bracket 174 secured to the inside surface of the front wall 16 and includes a pair of contacts 172a and 172b (FIG. 9) and movable switch member 172c adapted to connect and disconnect the contact. The switch member 172c is carried on a plunger 172d which is biased outwardly by an internal spring 173 to normally bias the switch member away from the contacts. The switch member is movable inwardly to bridge the contacts by a pivotally mounted lever 175 having a permanent magnet 176 mounted at the outer end. The outer end of the lever is biased inwardly against the outer end of the plunger 172d by a spring 177 (FIGS. 7 and 8) which is strong enough to overcome the internal spring 173 and normally close the switch member 172c across the contacts 172a and 172b. However, when the handle 164 of the dispensing valve is moved to the closed position (FIG. 7) the disk 170 becomes magnetized by permanent magnet 176, causing the two to be attracted and, consequently, the magnet moves outwardly against the inside surface of the nonmagnetic cabinet front wall 16. The attractive magnetic force exerted between the disk member 170 and the magnet 176 is of sufficient strength to overcome the lever biasing spring 177, and the internal spring 173 then is free to move the plunger 172d and switch member 172c away from the contacts 172a and 172b, breaking the connection therebetween whenever the handle of the dispenser valve is in the closed position.

When the handle 164 is moved to the open position (FIG. 8) for dispensing product from the freezing chamber, the disk 170 moves outwardly away from the front wall 16, and the attractive magnetic force between the disk 170 and magnet 176 is no longer sufficient to overcome the lever spring 177. When this occurs, the lever spring 177 overpowers the internal spring 173 and biases the plunger 172d inwardly to bridge or connect the contacts 172a and 172b with the switch member 172c.

From the foregoing description, it will be seen that the microswitch 172 is actuated in response to the magnetic field strength exerted between the disk 170 on the dispenser handle and the magnet 176. When the handle is closed to shut off the dispenser valve assembly 150, the switch contacts are opened and any time the handle is moved away from the closed position the contacts of the microswitch are closed. The switch is completely sealed from the exterior of the cabinet by the front wall 16 and no openings for the switch plunger are required. Consequently, long switch life is enhanced, since moisture and such cannot penetrate the wall 16 adjacent the switch area. Moreover, cleaning problems associated with prior art machines having switch plungers projecting through openings in the cabinet wall are nonexistent with the novel switching arrangement of the present invention wherein the switch is shielded by the front wall and is actuated in response to magnetic field strength from magnetic means externally of the cabinet.

Referring now to the schematic diagram of FIG. 9, the machine 10 includes a conventional refrigeration system for chilling the product within the freezing chamber 50. The refrigeration system includes the compressor drive motor 42 drivingly connected to the refrigerant compressor 40 and a fan 44 for cooling the condenser 46. Compressed refrigerant flows from the pressure side of the compressor 40 via a line 180 into the inlet of the condenser 46 and passes from the outlet of the condenser into a liquid receiver 182. The refrigerant flows from the outlet of the receiver through a thermal expansion valve 184 via a line 186 connected to the inlet 80 of the jacket 76 around the freezing chamber 50. After passing through the jacket 76 to chill and freeze the product in the freezing chamber the refrigerant flows through the jacket outlet 81 to the inlet side of the compressor via the return line 188.

In accordance with the invention, the microswitch 172 is closed anytime the dispenser valve assembly 150 is opened to dispense frozen product from the freezing chamber and closing or connecting of the switch contacts 172a and 172b causes the agitator drive motor 107 to be energized. The microswitch contacts are in series with one conductor 190 of an A.C. supply line and the other A.C. supply conductor 192 can be connected directly to one of the pairs of input terminals on the motors 42 and 107 via the leads 194 and 196. The A.C. lines are connected to a source of power, such as a wall outlet, through a main power switch 196 and line fuses 198. The contact 172b of the microswitch 172 is connected to a lead 200 running to one side of a relay coil 202a of a relay controlled switch 202, and the other side of the relay coil is connected to the other input side of the agitator drive motor 107 via a lead 204. Accordingly, when A.C. current is supplied to the lines 190 and 192, the motor 107 and relay coil 202a will be energized anytime the switch member 172c of the microswitch connects the contacts 172a and 172b.

When the relay coil 202a is energized, the switch member 202b of the relay is moved from its normally open position to a closed position, connecting or bridging a pair of contacts 202c and 202d. The contact 202c is connected to the A.C. line 190 via a lead 206, and contact 202d is connected via a line 207 to one side of a heater resistor 208 adjacent a thermostatic control switch 210 mounted on the freezing chamber 50 and responsive to the temperature of the product therein. The other side of the heater resistor is connected to the A.C. line 192 via a line 209 so that the resistor will be connected across the A.C. line whenever the microswitch 172 is closed and the relay coil 202a is energized.

In accordance with the invention, the thermostatic control switch 210 is seated adjacent a tubular well 212 (FIG. 2) extending radially outwardly from the inner wall 74 of the freezing chamber through the insulation material 82. The thermostat well is located approximately midway between the central portion of the freezing chamber and the rear end thereof and preferably is mounted on an inwardly extending ridge portion 76a between adjacent convolutions of the refrigerant passage 77. The inner end of the thermostat well is formed adjacent the inner wall 74 of the freezing chamber and, accordingly, is sensitive to the temperature of the product within the freezing chamber. The location of the well 212 at a point approximately midway between the center of the chamber and the rear end thereof has been found to provide for extremely accurate temperature regulation of the product, especially when the product being used is a carbonated beverage. Movement of the well to the midpoint or rear end of the freezing chamber has been found to result in the carbonated beverage either being not frozen enough or comprising too much liquid or, on the other hand, being frozen too stiffly. The control switch and well are positioned above the horizontal center of the freezing chamber rather than on the bottom half, and when the agitator 90 is not rotating and the product begins to slump away from the top portion of the chamber wall, the resultant change in temperature is sensed immediately. In prior machines having the sensing unit on the bottom portion of the freezing chamber, when slumping occurs, the region adjacent the sensing unit is still filled with product and, hence, reaction to temperature changes is not as timely.

The thermostat switch unit 210 preferably includes a temperature sensitive unit comprising a sensing bulb and bellows extending into the well 212 which is preferably filled with fluid, such as ethylene glycol, or the like, having good heat transfer characteristics and a low freezing temperature. The fluid is sealed in the well and accurately reflects the temperature of the product in the freezing chamber, and the temperature sensitive element being immersed in the fluid thus responds directly to the variations in the temperature of the product in the freezing chamber rather than the temperature of the refrigerant in the jacket. A pair of contacts 210b and 210c are provided in the thermostat switch unit, and an operator 210a is movable in response to the temperature of the sensing unit for connecting and disconnecting the contacts to make and break a circuit for energizing the refrigeration system motor 42. To this end, the contact 210c is connected to the A.C. line 190 via a lead 215, and the contact 210b is connected to the other one of the input terminals of the motor 42 via a lead 216. Accordingly, when the contacts 210b and 210c are electrically connected by the operator 210a, the motor 42 is energized. One of the contacts in the thermostatic switch 210 is adjustable so that the circuit will be closed whenever the temperature of the product in the freezing chamber 50 reaches or falls below a selectively adjustable low level temperature. Moreover, whenever the heater resistance 208 is energized by closing of the microswitch 172 and contacts of the relay 202, the thermally sensitive element 210a is actuated artificially by the heat generated in the resistance, and the refrigeration system is put in operation. This insures that the product in the freezing chamber will not become too warm during the period when the product is being dispensed through the dispenser valve assembly 150 and fresh liquid product is refilling the rearward end of the chamber from the conduit 70 and liquid container or reservoir 48.

It is to be understood that the schematic representation shown in FIG. 9 and described herein is presented by way of illustration and not limitation and modifications and refinements of the circuit occurring to one skilled in the art can be made without departing from the spirit and scope of the invention as defined in the claims.

The machine 10 illustrated and described and embodying the features of the present invention provides many advantages over prior art machines, including the capability of producing and dispensing a food product in both a liquid form and in a frozen or semiliquid condition. Moreover, novel means are provided for preventing the freeze-up of liquid product in the liquid reservoir and novel means are provided for energizing the agitator assembly in the freezing chamber whenever product is dispensed therefor. In addition, a novel thermostatic temperature control arrangement is provided for accurately and steadily maintaining the product in the freezing chamber at the desired temperature.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. In an apparatus for producing and dispensing frozen and semiliquid products, the combination comprising a freezing chamber for freezing and agitating said product, container means above said freezing chamber for holding a supply of said product in liquid form, conduit means communicating between said container means and freezing chamber for supplying liquid product to the latter, and valve means in said conduit means including a fixed valve seat and a valve member below said seat, said valve member being movable upwardly and downwardly with respect to said seat in response to the level of frozen or semifrozen product in said conduit means and seatable in a closed position against said seat for limiting the upward travel of said frozen or semiliquid product in said conduit means, said valve seat comprising a hollow sleeve inserted from the upper end of said conduit means and including an outwardly extending, annular flange at the upper end engaging the upper end of said conduit means for limiting the downward insertion of said seat therein.

2. The combination of claim 1 wherein said valve seat includes an annular seating surface substantially conforming to the shape of said valve member confronting said seat and including one or more recessed passages formed in said seating surface and communicating between the upper and lower ends thereof permitting passage of liquid and gas through said conduit means when said valve member is seated in closed position against said seat by the upward force of frozen or semiliquid products in said conduit means below said seat.

3. The combination of claim 2 wherein said seating surface comprises a downwardly facing, substantially frustoconical surface and said valve member comprises a sphere having a diameter smaller than said conduit means.

4. The combination of claim 2 wherein said valve means includes a valve member retainer extending downwardly from and supported by said seat within said conduit means for limiting the downward travel of said valve member away from said seating surface.

5. The combination of claim 4 wherein said retainer comprises a U-shaped saddle having a lower bight portion diametrically disposed in said conduit means and a pair of upstanding legs having upper end portions detachably secured to said valve seat.

6. The combination of claim 5 wherein said seat comprises a tubular sleeve having a pair of diametrically spaced, radially inwardly projecting recesses formed in the outer surface thereof and wherein the upper end portions of said legs include inwardly extending hooks normally seated in said recesses in said sleeve having a pair of recesses formed in the outer surface thereof and wherein the upper end portions of said legs include inwardly extending hooks normally seated in said recesses in said sleeve to hold said retainer in place.

7. A dispensing freezer apparatus for producing frozen and semiliquid product comprising container means for holding a supply of said product in liquid form, a freezing chamber for freezing and agitating said liquid product, conduit means communicating between said container means and said freezing chamber for supplying said liquid product to the latter for freezing, first dispensing means in communication with said container means for dispensing liquid product therefrom, second independent dispensing means in communication with said freezing chamber for dispensing frozen and semiliquid product therefrom, and valve means in said conduit means movable between an open and a closed position for preventing the upward travel of frozen and semiliquid product from said freezing chamber into said container means through said conduit means.

8. The apparatus of claim 7 including passage means in said conduit means bypassing said valve means for permitting flow of gas and liquid through said conduit means when said valve means is closed.

References Cited

UNITED STATES PATENTS

| | | | |
|---|---|---|---|
| 2,059,485 | 11/1936 | Payne et al. | 62—343 X |
| 2,191,344 | 2/1940 | Erickson et al. | 62—343 |
| 1,591,799 | 7/1926 | Tinapp | 62—188 X |
| 2,523,853 | 9/1950 | Woodruff | 62—69 |
| 2,978,143 | 4/1961 | Arnett et al. | 222—129.1 X |
| 3,123,255 | 3/1964 | Martin | 222—129.1 X |
| 3,180,110 | 4/1965 | Dunn | 62—343 |
| 3,222,035 | 12/1965 | Lutz et al. | 62—70 X |

WILLIAM E. WAYNER, Primary Examiner

U.S. Cl. X.R.

62—135; 222—129.1